United States Patent
Park et al.

(10) Patent No.: US 9,514,523 B2
(45) Date of Patent: Dec. 6, 2016

(54) METHOD AND APPARATUS FOR FILLING IMAGES CAPTURED BY ARRAY CAMERAS

(71) Applicant: Intel Corporation, Santa Clara, CA (US)

(72) Inventors: Sung Hee Park, Stanford, CA (US); Kalpana Seshadrinathan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/546,633

(22) Filed: Nov. 18, 2014

(65) Prior Publication Data

US 2016/0140700 A1     May 19, 2016

(51) Int. Cl.
| | |
|---|---|
| *G06K 9/40* | (2006.01) |
| *G06T 5/00* | (2006.01) |
| *G06T 5/20* | (2006.01) |
| *G06T 11/60* | (2006.01) |
| *G06T 7/40* | (2006.01) |

(52) U.S. Cl.
CPC ............... *G06T 5/005* (2013.01); *G06K 9/40* (2013.01); *G06T 5/20* (2013.01); *G06T 7/408* (2013.01); *G06T 11/60* (2013.01); *G06T 2207/10012* (2013.01); *G06T 2207/20182* (2013.01)

(58) Field of Classification Search
CPC ...... G06K 9/6203; G06K 9/6204; G06K 9/32; G06K 9/6423; G06K 9/6407; G06K 9/686; G06T 5/20
See application file for complete search history.

(56) References Cited

U.S. PATENT DOCUMENTS

| | | | | |
|---|---|---|---|---|
| 4,214,829 A | * | 7/1980 | Ohashi ................... | G03B 17/14 396/148 |
| 6,980,177 B2 | * | 12/2005 | Struyk .................... | G09G 5/02 345/5 |

(Continued)

OTHER PUBLICATIONS

International Search Report and Written Opinion for International Patent Application No. PCT/US2015/056075, mailed on Feb. 25, 2016.

(Continued)

*Primary Examiner* — Amir Alavi
(74) *Attorney, Agent, or Firm* — Green, Howard & Mughal, LLP

(57) ABSTRACT

Image filling utilizing image data captured by an array of cameras having different camera viewpoints. Image data, such as a pixel value or gradient value associated with a spatial point in a source region of an image is transferred to the same or another image to fill a target region. Visual artifacts may be reduced by filling portions of the target region visible from other viewpoints with expanded source patches to reduce the size of the target region to be inpainted. In embodiments, a shifted mask corresponding to the target region is determined for each supplementary image based on an estimate of foreground disparity. In further embodiments, partially occluded regions are detected based on an estimate of background disparity. Source patches may be expanded based on a baseline between camera viewpoints into large coherent regions that agree well with the target region boundary may be filled without hallucinating image data from similar patches.

23 Claims, 11 Drawing Sheets

(56) References Cited

U.S. PATENT DOCUMENTS

| | | | |
|---|---|---|---|
| 6,987,520 B2 | 1/2006 | Criminisi et al. | |
| 7,834,894 B2 | 11/2010 | Swanson et al. | |
| 8,299,413 B2* | 10/2012 | Vogt | G06T 5/50 |
| | | | 250/208.1 |
| 8,654,234 B2* | 2/2014 | Hirsch | G06F 3/0325 |
| | | | 348/211.1 |
| 2008/0238942 A1 | 10/2008 | Sun et al. | |
| 2011/0123113 A1 | 5/2011 | Berretty et al. | |
| 2014/0056473 A1 | 2/2014 | Tojo | |
| 2014/0133755 A1* | 5/2014 | McCloskey | G06T 5/005 |
| | | | 382/173 |
| 2014/0169667 A1 | 6/2014 | Xiong et al. | |
| 2015/0243033 A1* | 8/2015 | Uemori | G06T 7/0044 |
| | | | 382/103 |

OTHER PUBLICATIONS

"Imagestack." [Online]. Available: https://code.google.com/p/imagestack/, retrieved Jul. 22, 2016, 3 pages.

Bhat, et al. "GradientShop: A Gradient-Domain Optimization Framework for Image and Video Filtering," ACM TOG, 2010, 15 pages.

Criminisi, et al. "Region Filling and Object Removal by Exemplar-Based Image Inpainting," IEEE TIP, vol. 13, No. 9, Sep. 2004, 13 pages.

Gonzalez, et al. "Digital Image Processing," Prentice Hall, 2002, 122 pages.

Hervieu, et al. "Stereoscopic Image Inpainting: Distinct Depth Maps and Images Inpainting," IEEE ICPR, 2010, 4 pages.

Hervieux, et al. "Stereoscopic Image Inpainting using Scene Geometry," IEEE ICME, 2011, 6 pages.

Miled, et al. "Dense Disparity Estimation from Stereo Images," 3rd International Symposium on Image/Video Communications, Sep. 2006, 4 pages.

Okutomi, et al. "A Multiple-Baseline Stereo," IEEE PAMI, vol. 15, No. 4, Apr. 1993, 11 pages.

Szeliski, et al. "Locally Adapted Hierarchical Basis Preconditioning," ACM TOG, 2006, 9 pages.

Wang, et al. "Stereoscopic Inpainting: Joint Color and Depth Completion from Stereo Images," IEEE CVPR, 2008, 8 pages.

* cited by examiner

METHOD AND APPARATUS FOR FILLING IMAGES CAPTURED BY ARRAY CAMERAS

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc.

Often, a digital camera user wishes to fill in a region of an image, for example to remove a foreground object from a scene, after the image is captured. Image inpainting is a technique used to fill regions in digital images and may be used to remove unwanted objects. From a captured image, a user can specify a target, or destination, region to be filled. The target region is automatically replaced with hallucinated image contents that look plausible and combine naturally with retained parts of the image scene. In one conventional approach to image filling illustrated in FIG. 1, image patches sourced from background region 103 of image 120 captured by digital camera 110 are combined to fill in target region 105 and replace foreground object 102. Image patches are identified as similar exemplars and transferred to the boundaries of the target region. This process is repeated along the target contour until the target region is completely filled. However, when only a single image viewpoint is employed, inpainting of relatively large portions in a scene can result in an output image 190 that suffers significant visual artifacts 195.

Advanced mobile devices with multiple cameras embedded in the same device are now becoming commercially available. For such a platform, multiple images may be captured from different viewpoints of a scene at one instant in time. Some conventional stereo inpainting techniques have employed depth information derived from disparity between images collected from stereo cameras. These techniques however have thus far proven to be too computationally intensive for ultra light and low-power mobile platforms.

Computationally inexpensive automated image filling techniques capable of reducing visual artifacts by leveraging a richer set of input information available through multiple image viewpoints are therefore highly advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
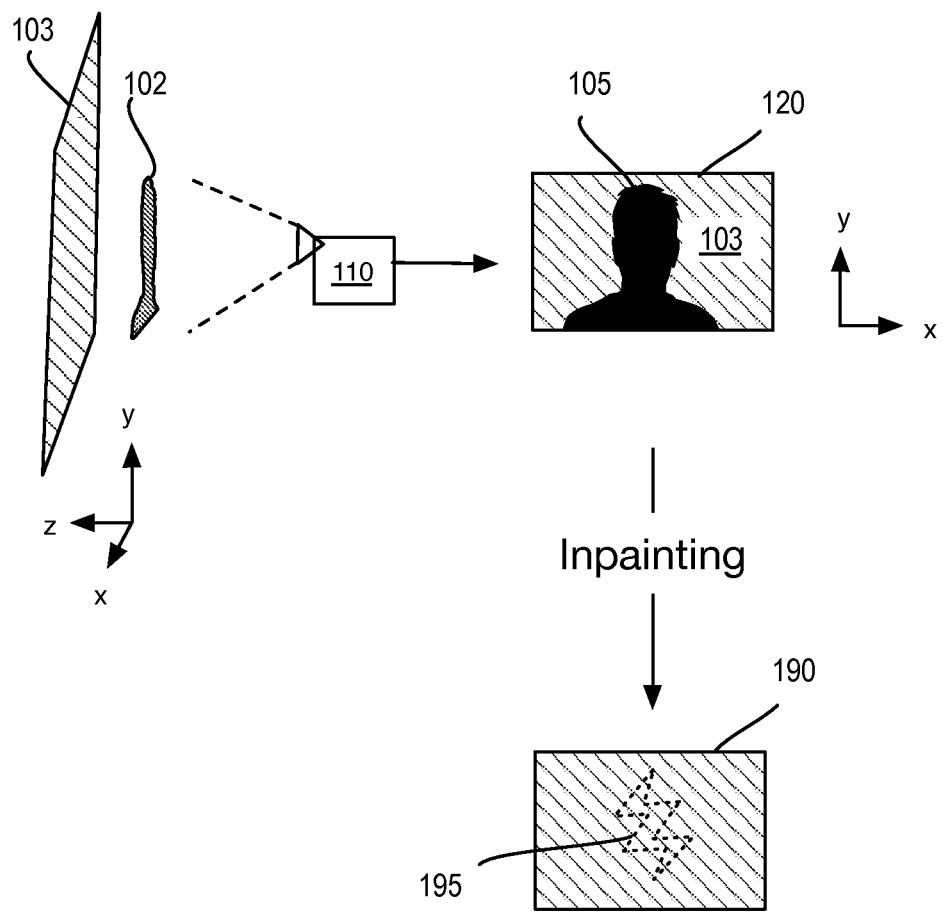
FIG. 1 is a conventional image filling process based on inpainting of image data captured by a single camera.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for image filling with image data captured by an array of cameras having different camera viewpoints. Image data, such as a pixel value or gradient value associated with a spatial point or pixel position in a source region of an image is transferred to a corresponding point in another image to fill a target region. Visual artifacts may be reduced by filling portions of the target region visible from other viewpoints with expanded source patches, thereby reducing the size of the target region to be inpainted and improving image coherence at the boundary of the target region.

Figure 2:
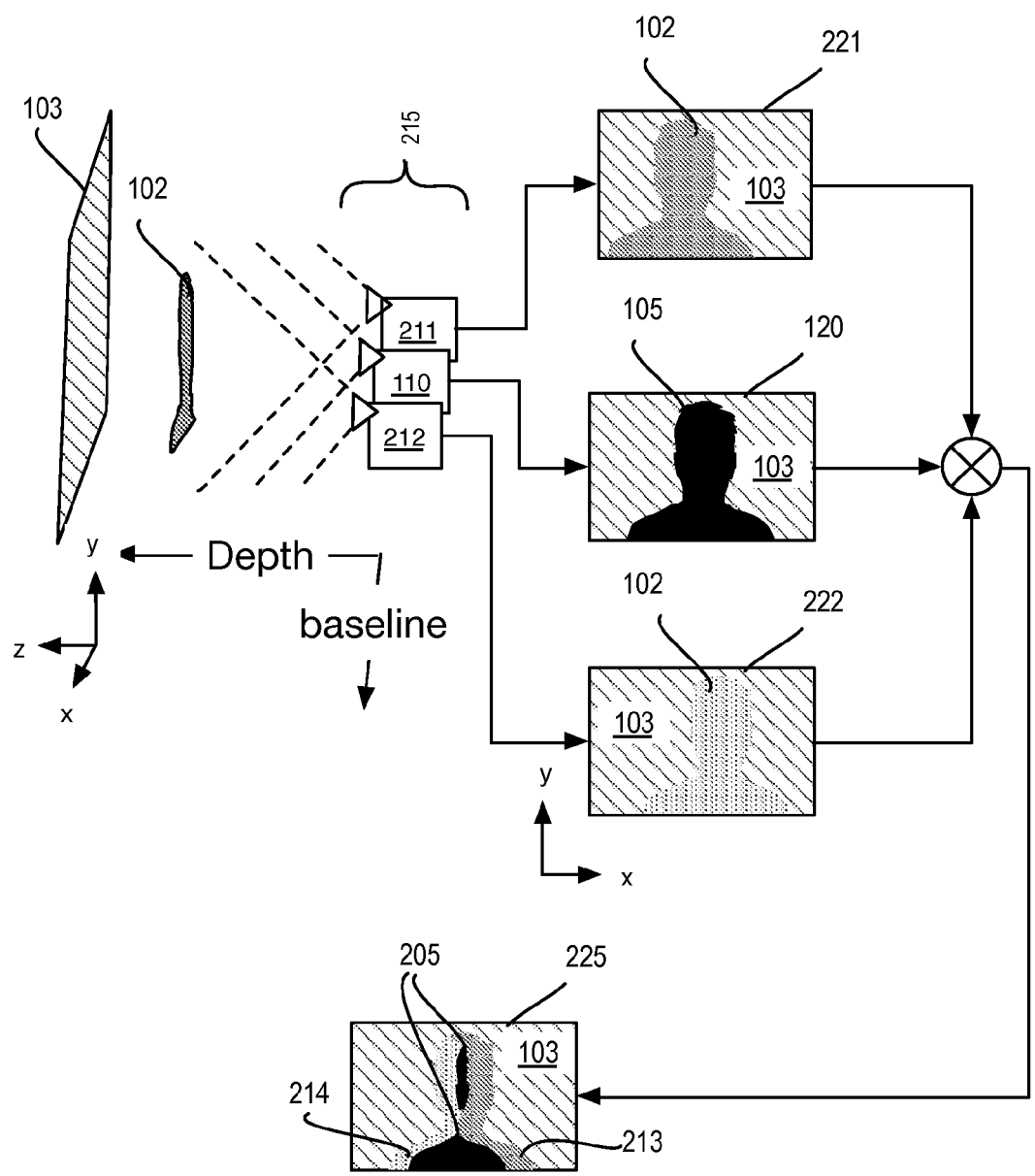
FIG. 2 is a schematic for combining a plurality of images captured by an array camera having a predetermined baseline relationship, in accordance with one or more embodiment.

FIG. 2 is a schematic for combining a plurality of images captured by an array camera 215 having a predetermined baseline relationship, in accordance with one or more embodiment. As illustrated, a device platform, such as a mobile computing device, includes a plurality of camera modules 110, 211, and 212. Although exemplary embodiments described in greatest detail herein utilize three camera modules, two through n (any number) of camera modules and/or image sensors may be included in an array camera as embodiments herein are not limited in this respect. Each of the plurality of camera modules 110, 211, 212 output an image captured from a different camera viewpoint. In exemplary embodiments, the image(s) captured from each viewpoint is captured at substantially the same instant of time such that they contain image data for a given scene. For example, at least a portion of scene including a foreground object (subject) 102 and background region 103 is captured in each of images 120, 221, and 222. Each image 120, 221, 222 may be associated with a fixed relative camera viewpoint. In embodiments, one of the plurality of cameras and/or viewpoints is designated as a reference. For example, where camera module 110 has a higher resolution (e.g., 8 megapixel, or more) than camera modules 211, 212 (e.g., 720p, HD, etc.), camera module 110 may be the default reference with the image 120 then being the default reference image $I_{ref}$. Camera modules 211 and 212 may be considered supplemental to the reference and are each associated with predetermined baseline vector (length and direction) from camera module 110. In an exemplary embodiment where camera modules 110, 211, and 212 are on a mobile platform, the baseline vector between the reference camera module and each supplemental camera module may have a length of tens of mm to tens of cm, depending on the form factor. In other embodiments, where camera modules 110, 211, 212 are separate infrastructure fixtures, baseline lengths may be on the order of meters. In one exemplary mobile device embodiment, camera modules 110, 211, and 212 are along one baseline with camera modules 211 and 212 spaced by known distances on opposite sides of reference camera module 110.

Figure 3:
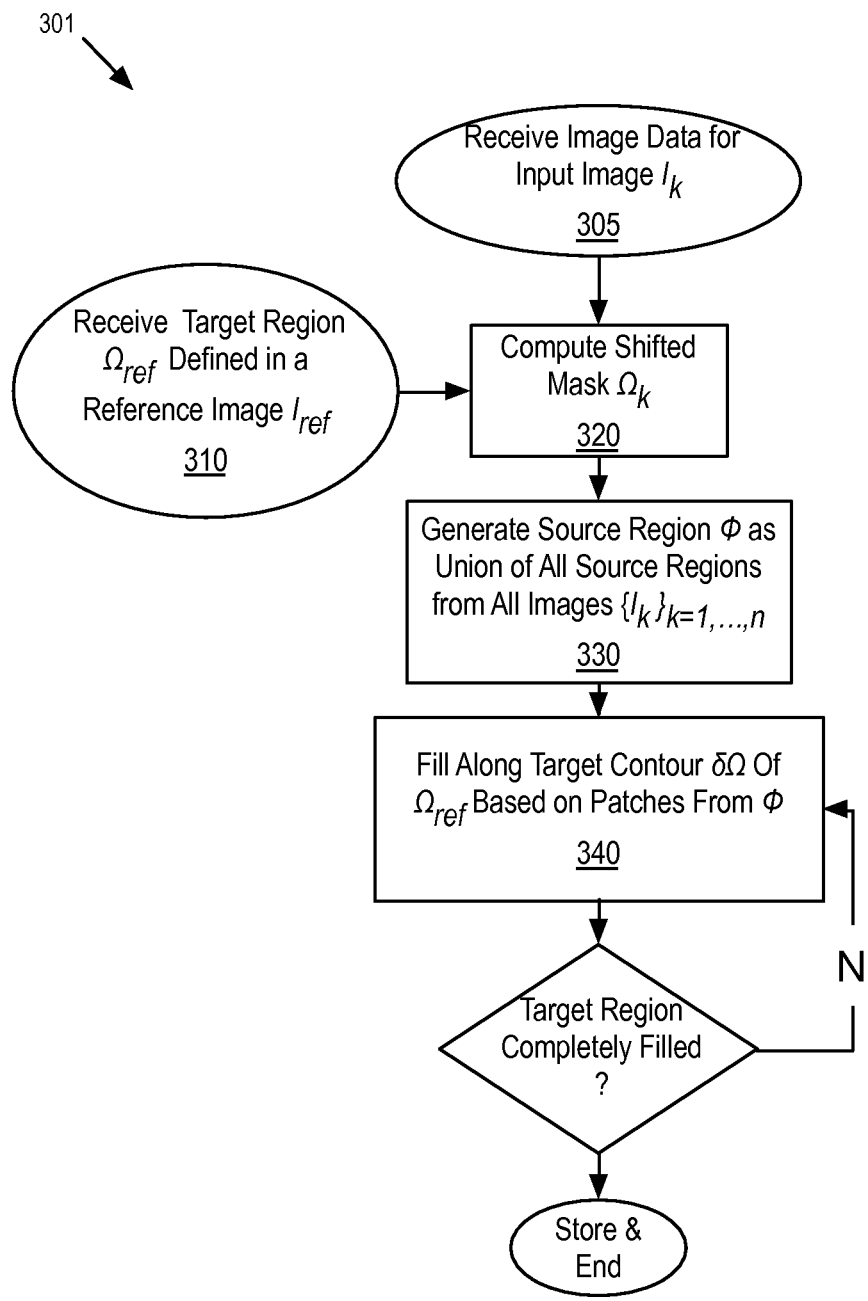
FIG. 3 is a flow diagram of a method of filling a target region based on image data captured by an array camera, in accordance with one or more embodiment.

FIG. 3 is a flow diagram of a method 301 for filling a target region based on image data captured by an array camera, in accordance with one or more embodiment. Method 301 begins at operation 305 where image data is received for input images $\{I_k\}_{k=1,\ldots,n}$, one of which is designated as the reference image $I_{ref}$, and the remainder of which are processed relative to the reference. Each input image $I_k$ is associated with a different camera viewpoint. For example, in the embodiment illustrated in FIG. 2 the camera array/array camera 215 outputs input images $\{I_k\}_{k=1,2,3}$ (120, 221, 222). In one exemplary embodiment, the image data received is in the form of pixel values (e.g., intensity). In alternative embodiment, gradient values are received as the image data, and/or gradient values are determined based on pixel values as preprocessing upstream of method 301. In further embodiments, each input image $I_k$ is normalized with respect to the reference image $I_{ref}$, for example through any known histogram matching technique.

A target region $\Omega_{ref}$ is received as another input to method 301 (FIG. 3). Target region $\Omega_{ref}$ defines a region in the reference image $I_{ref}$ that is to be filled in (replaced) with other image data. Target region $\Omega_{ref}$ may be predetermined upstream of method 301 using any technique as embodiments are not limited in this respect. In one exemplary embodiment, target region $\Omega_{ref}$ is predetermined based on a device user's input, for example through a highlighting of a portion of the reference image $I_{ref}$ output to a display on the user's device. Referring again to FIG. 2, an exemplary target region 105 overlays a foreground object 102 within image 120. As such, filling method 301 is to remove object 102 from image 120 and transfer in place of object 102 image contents that look plausible and combine naturally with retained portions of the image 120 (e.g., background region 103).

Figure 4:
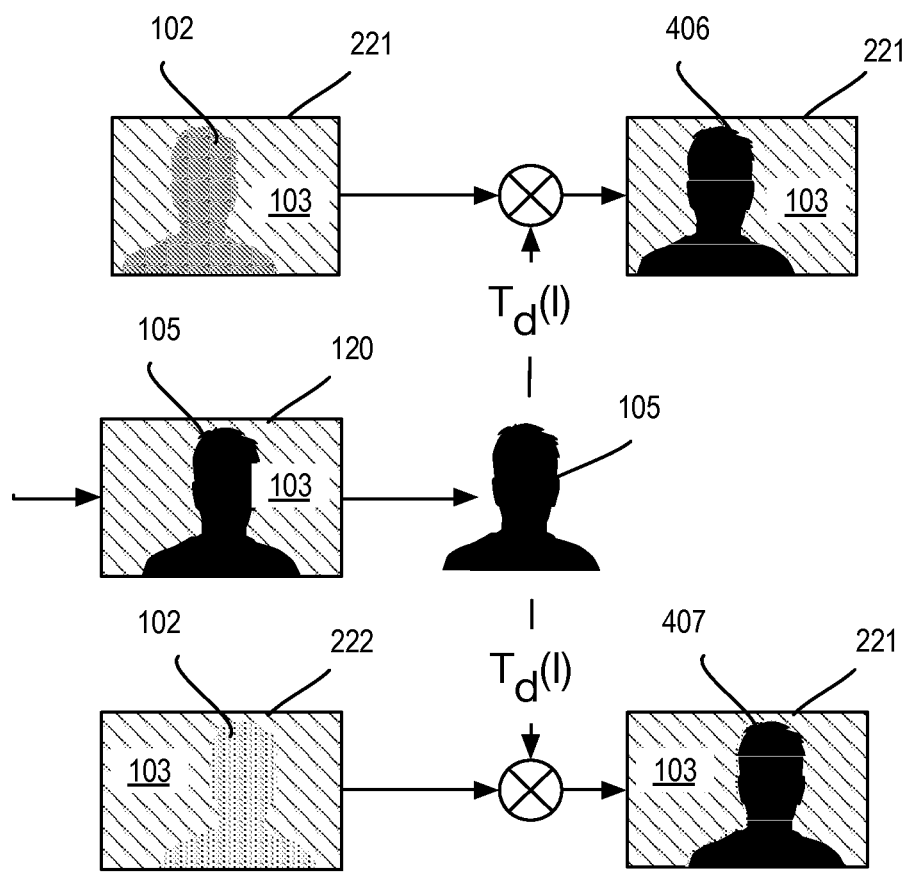
FIG. 4 is a schematic further illustrating determination of masks in supplementary images collected by an array camera, in accordance with an embodiment.

In embodiments, the target region $\Omega_{ref}$ is transferred to the other camera positions/viewpoints. To the extent target region $\Omega_{ref}$ is visible from other cameras/camera viewpoints in the array, the regions in each of the supplementary images corresponding to the target region $\Omega_{ref}$ are masked to ensure target region $\Omega_{ref}$ is excluded from an inpainting process sourcing image data from multiple images output by the array. In one exemplary embodiment where the objects in target region $\Omega_{ref}$ correspond to a single depth plane, target region $\Omega_{ref}$ is assumed shifted by a constant amount in the other images as a function of their associated camera baseline. Referring again to FIG. 3, method 301 proceeds to operation 320 where a shifted mask $\Omega_k$ is computed for the $k^{th}$ image $I_k$. A shifted mask may be computed for each of the supplementary (non-reference) images. FIG. 4 is a schematic further illustrating determination of masks in supplementary images collected by an array camera, in accordance with an embodiment. As shown, shifted masks 406 and 407 are computed by applying $T_d(I)$, which is a translation of image I by displacement d, to target region 105. The translation displacement d applied to the target region for each image may be determined by a variety of techniques. In one exemplary embodiment, the kth shifted mask $\Omega_k$ is translated by distance equal to a disparity value for foreground objects $d_{F,k}$. The foreground disparity value $d_{F,k}$ may be estimated as the translation distance that minimizes a difference, summed over the target region $\Omega_{ref}$, between data values in the reference image $I_{ref}$ and data values of corresponding positions (pixel locations) within the kth image $I_k$. As one example, $d_{F,k}$ is estimated as:

$$d_{F,k} = {_d}^{argmin} \Sigma_{p' \in \Omega_{ref}} |I_{ref}(p') - T_{-d}(I_k)(p')|, \quad (1)$$

where p' is the pixel location. Alternative difference sums (e.g., SSD) may be utilized as well. Notably, although Eq. (1) performs the estimation in a pairwise manner, a shift mask may be determined for all images concurrently (e.g., using any known multi-baseline stereo technique) where baselines for all cameras in the array are known. The shifted mask $\Omega_k$ for image $I_k$ is then be determined as:

$$\Omega_k = T_{dF,k}(\Omega_{ref}). \quad (2)$$

Method 301 continues at operation 330 where a source region $\Phi$, from which candidate patches may be determined, is generated by combining unmasked portions of all input images:

$$\cup_{k=1}^{n} I_k - \Omega_k, \quad (3)$$

where $I_k$ represents the entire image region of the kth camera. At operation 340 the target region is filled by replacing destination patches, each associated with a point/pixel position in the target region, with similar source patches determined from an unmasked region in one of the plurality of images (reference or supplemental). The target region may be iteratively filled with an inpainting technique that follows target region contour $\delta\Omega$ and successively fills destination patches along the contour $\delta\Omega$ with similar source patches identified from source region $\Phi$. In one advantageous embodiment, a source patch is selected based on a comparison between neighborhood elements of candidate source patches and neighborhood elements of the destination patch. Following known techniques, an exemplar in $\Phi$ may be determined by minimizing the sum of per-pixel distances with corresponding values copied into the target region. The iterative filling process may be repeated until the entire target region $\Omega_{ref}$ is filled and method 301 ends with storing the modified reference image to an electronic memory. Ordering of the image filling iterations may be determined following known techniques to preserve coherence in image structures as target contour $\delta\Omega$ fill front advances.

In further embodiments, operation 340 further includes detection of partially occluded target regions, and the image filling operation is made a function of detecting such partially occluded regions. As used herein, a partially occluded region is a portion of target region $\Omega_{ref}$ for which additional image data is available because that region is visible from another camera/viewpoint. FIG. 2 further illustrates an example of partially occluded regions 213 and 214 for target region 105. As shown, target region 105 includes partially occluded region 213 as a result of the viewpoint of camera 211, and partially occluded region 214 as a result of the viewpoint of camera 212. Only portions 205 of target region 105 are fully occluded from all camera viewpoints such that no image information about background region 102 is known. Partially occluded regions may vary in size as a function of camera array baselines and depth of the object(s) within target region 105. Partially occluded regions may be efficiently filled using image data from the other cameras so that only the fully occluded regions (e.g., portions 205) need then be filled by exemplars from source region $\Phi$. One advantageous filling method that is dependent on a partial occlusion determination is summarized as pseudo code:

```
//
1:   for all p ∈ δΩ do
2:       if Ψ_p ∩ O ≠ φ then     /*visible from other views*/
3:           Search for best source patch Ψ_q in W_r
4:           for all β ∈ B do
5:               Transfer Ψ_{q+βv_k} to Ψ_{p+βv_k}
6:           end for
7:       else                     /*occluded in all views*/
8:           Search for best source patch Ψ_q in φ
9:           Transfer Ψ_q to Ψ_p
```

```
10:      end if
11:   end for
//
```

Notably, the above image filling method is conditioned on a pixel location being within a partially occluded region. In response to determining a point in the target region is occluded from all of the viewpoints, a destination patch $\Psi_q$ is inpainted (e.g., a similar source patch $\Psi_q$ is selected based on a comparison between neighborhood elements of candidate source patches and neighborhood elements of the destination patch). However, in response to determining a point in the target region is only partially occluded (i.e., visible in a second image), a source patch $\Psi_q$, and advantageously a source patch expanded to a larger coherent region ($\Psi_{q+\beta v_k}$), corresponding to the partially occluded region that is visible in a second image is transferred to fill in an associated target region ($\Psi_{p+\beta v_k}$).

Figure 5:
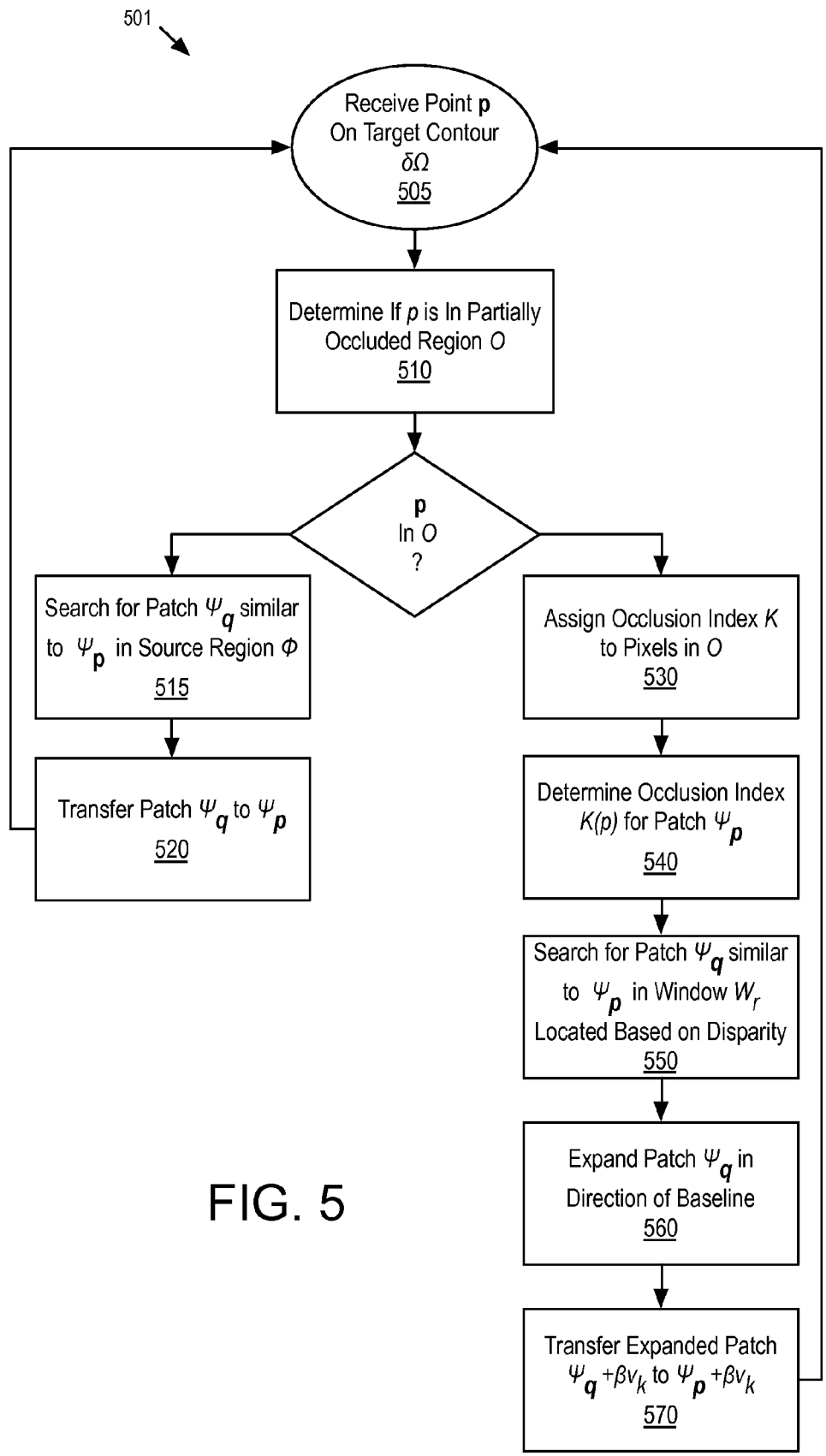
FIG. 5 is a flow diagram of a method for filling a target region based on image data captured by an array camera, in accordance with one or more embodiment.
Figure 6A:
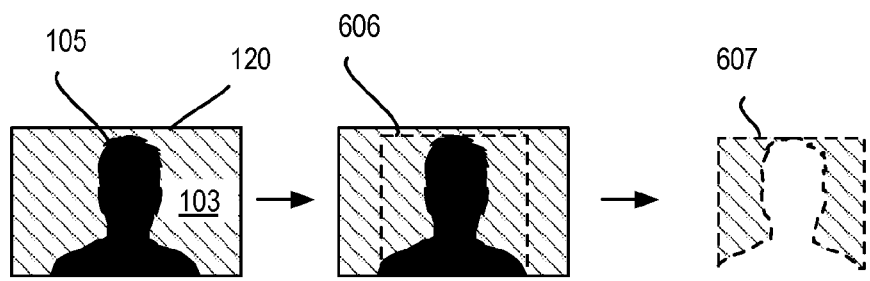
FIG. 6A illustrates a determination of a surrounding foreground region, in accordance with an embodiment.

FIG. 5 is a flow diagram of a method 501 for filling a target region that is dependent on a partial occlusion determination, in accordance with one or more embodiment that comports with the pseudo code above. In one such embodiment, method 501 is performed at operation 350 in FIG. 3. Method 501 begins with receiving a pixel position p along target contour $\delta\Omega$ at operation 505. Partially occluded region(s) O is(are) determined at operation 510, and pixel position p evaluated for inclusion in O. In embodiments, a partially occluded region O is determined based on both the foreground disparity value $d_{F,K}$, which may be estimated as described above, and a background disparity value $d_{B,K}$. In one advantageous embodiment, background disparity value $d_{B,K}$ is estimated by first determining a minimum bounding box $W_\Omega$ that contains $\Omega_{ref}$. From the bounding box $W_\Omega$, a surrounding foreground region is defined. FIG. 6A illustrates a determination of a surrounding foreground region, in accordance with one exemplary embodiment. As shown, a minimum bounding box 606 is determined for a target region $\Omega_{ref}$. Foreground surrounding region 607 is determined by taking an intersection of minimum bounding box $W_\Omega$ and $\Omega_{ref}^c$, which is a complementary region of target region $\Omega_{ref}$. Assuming this foreground surrounding region is also constrained to a single depth plane, background disparity value $d_{B,K}$ may be estimated as the translation distance that minimizes a difference, summed over the intersection $W_\Omega \cap \Omega_{ref}^c$, between data values in the first image and data values of corresponding positions within the kth image by applying Eq. (1).

From the estimated disparity value $d_{B,K}$, partially occluded region O may be determined as:

$$\cup_{k=1}^n O_k, \quad (4)$$

where the kth occluded region $O_k$ may be represented as:

$$O_k = T_{-dB,k}(T_{dF,k}(\Omega_{ref})^c \cap T_{dB,k}(\Omega_{ref})) \quad (5)$$

Following Eq. (5), an intersection of the complement of the target region $(\Omega_{ref})^c$ translated by the foreground disparity value, and the target region $\Omega_{ref}$ translated by the background disparity value is determined. Occluded region $O_k$ is then identified as a translation of this intersection by a distance equal in to, but in a direction opposite of the background disparity value. $O_k$ is empty if the foreground disparity value $d_{F,k}$ is equal to the background disparity value $d_{B,k}$, meaning no occlusion region is detected.

Referring still to FIG. 5, if a point associated with pixel position p is not included in occluded region O, method 501 proceeds to operation 515 where source region $\Phi$ is searched for source patch $\Psi_q$ similar to destination patch $\Psi_p$ following a known inpainting technique. At operation 520 image data for selected similar patch $\Psi_q$ is then transferred to destination patch $\Psi_p$, and method 501 iterates to a next pixel position p on target contour $\delta\Omega$.

If instead pixel position p is included in partially occluded region O, method 501 proceeds to operation 530 where an occlusion index K is assigned to each pixel in the partially occluded region O. Occlusion index K may serve as a basis for selecting a source patch from the image captured by a camera located the furthest away from the reference camera, which gives the largest occluded regions. In one exemplary embodiment occlusion index K is determined as:

$$K(p) = \underset{k:\ p \in O_k, 1 \le k \le n}{\operatorname{argmax}}\ l_{BL}(k), \quad (6)$$

where $l_{BL}(k)$ is the baseline distance between the kth camera and the reference camera. Following Eq. (6), when occluded regions for different cameras overlap each other, the occluded region from the camera located furthest away from the reference camera is selected to provide the source patch $\Psi_q$.

Method 501 continues to operation 540 where occlusion index K(p) for the destination patch $\Psi_p$ is selected, for example based on the votes from K(p'), $p' \in \Psi_p$. At operation 550, occluded region $O_{K(p)}$ is searched for a similar source patch $\Psi_q$ in a rectangular (e.g., r×r) window $W_r$ that is centered at $p+d_{B,K(p)}$. In other words, the disparity of the background $d_{B,K(p)}$ is utilized as an initial estimate and a small local search is applied over a sub-region of the selected occluded region to allow for possible deviation resulting from variation in object depth. Notably, the search at operation 550 is fast because the size of sub-region $W_r$ is generally much smaller than source region $\Phi$.

Figure 6B:
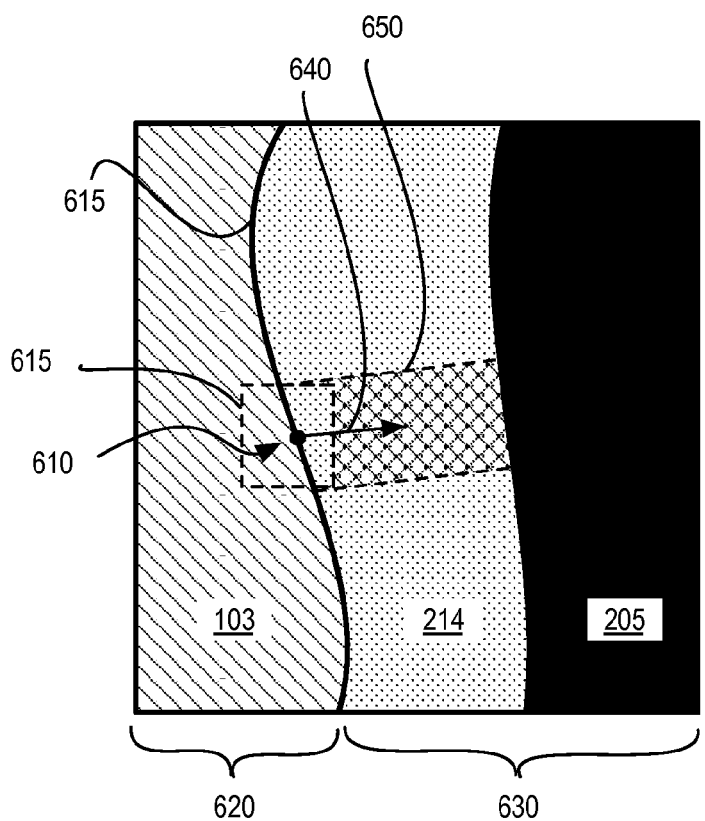
FIG. 6B illustrates a portion of an image to be filled with an expanded patch from a partially occluded region, in accordance with an embodiment.

Method 501 then completes an image filling iteration with a connected region in $O_{K(p)}$ being transferred to target region $\Omega_{ref}$. In the exemplary embodiment, this connected region is obtained by first expanding $\Psi_p$ in the direction of the associated camera baseline at operation 560. Then at operation 570, the expanded source patches in $O_{K(p)}$ are copied into corresponding expanded destination patches. In the exemplary embodiment, all expanded source patches represented as $\Psi_{q+\beta v_k}$ are copied to corresponding expanded destination patches $\Psi_{p+\beta v_k}$, where β is a positive scaling factor and $v_k$ is a vector representing the baseline between the kth camera and the reference camera. FIG. 6B is an illustration of a portion of an image to be filled with an expanded patch 650 from a partially occluded region 214, in accordance with an embodiment of method 501. As depicted in FIG. 6B, target region 630 includes partially occluded region 214 and fully occluded region 205. Target region contour 615 interfaces target region 630 with background (source) region 103. Following embodiments herein, with destination patch 615 associated with point 610 overlapping partially occluded region 214 as depicted, the search for the similar patch $\Psi_q$ occurs around the sub-region as described above. The vector 640 ($v_k$) is then utilized to determine the direction and/or magnitude of expanded patch 650 ($\Psi_{q+\beta v_k}$).

Figure 7:
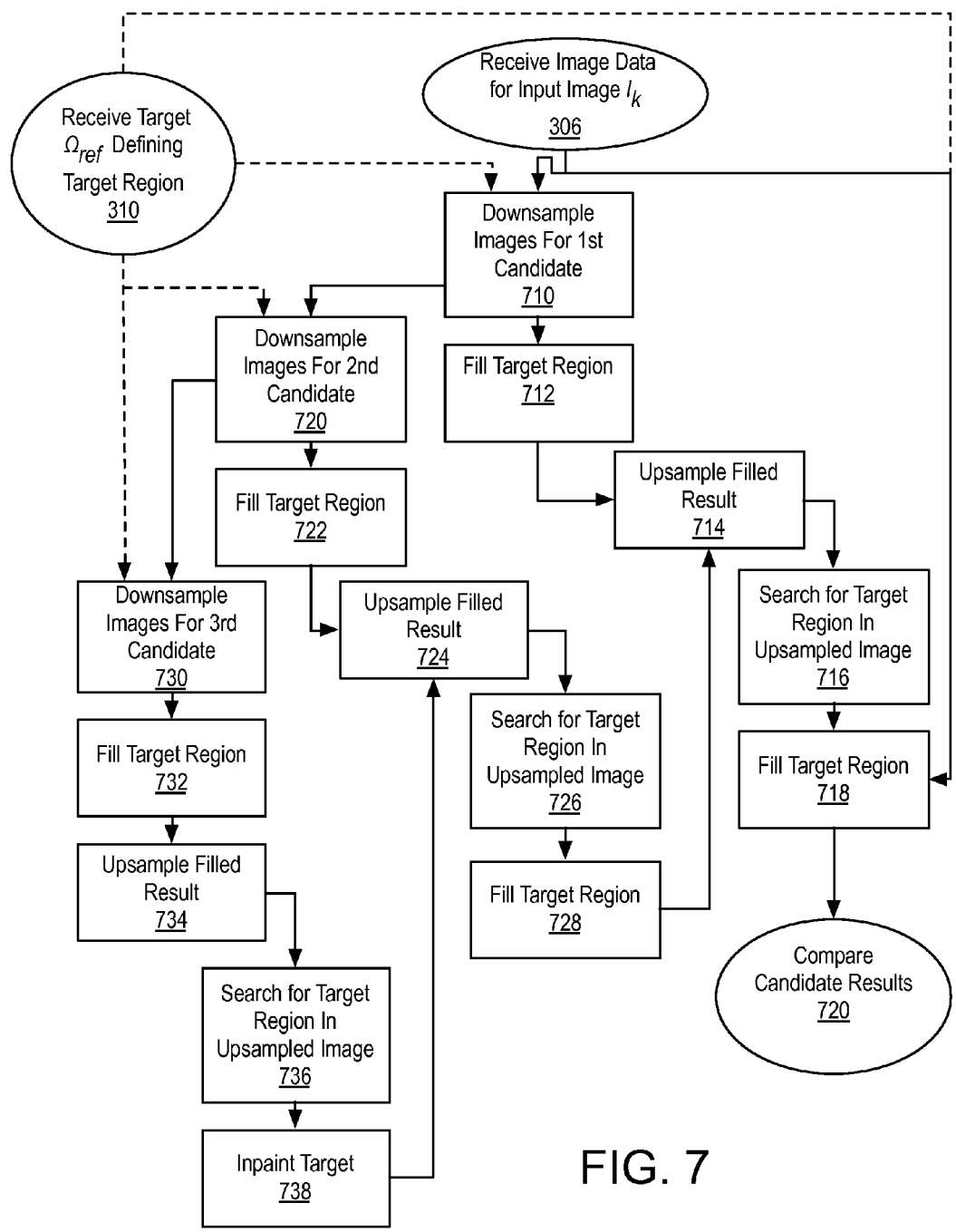
FIG. 7 is a flow diagram of a multi-scale method of generating a plurality of filled candidate images, in accordance with an embodiment.

In further embodiments, the image-filling methods describe above are employed in a multi-scale technique. For such embodiments, the image filling is better able to manage image structures in different scales and the filling quality may improve (i.e., fewer visual artifacts). FIG. 7 is a flow diagram of a multi-scale method 701 for generating a plurality of filled candidate images, in accordance with an embodiment. In method 701, the image filling method described above (e.g., method 301 further employing method 501) is repeatedly applied from coarse to fine spatial scales.

Method 701 begins with receiving the image data for a plurality of input images at operation 306, substantially as described elsewhere herein. Downsampled images are then employed in the performance of the image filling methods above. Depending on the embodiment, one, two, or three different scales may be utilized to generate different candidate results. FIG. 7 illustrates three reduced scale levels with the first being downsampled from a non-scaled implementation where image filling methods described above are performed at operation 718. In exemplary embodiments, the scale factor between two nearest scales is set to 2. For a first scaled candidate result, input images are downsampled at operation 710. These downsampled images are then used at operation 712 to fill the target region by the methods described above. The filled result is then upsampled at operation 714 to obtain a low-resolution initial guess of the target region in the next finer scale. At operation 716 a search is performed for similar patches that also agree with the initial guess. These patches are then employed to fill target region 718 to generate the first scaled candidate result. For a second scaled candidate result, input images downsampled at operation 710 are further downsampled at operation 720. These downsampled images are then used at operation 722 to fill the target region by the methods described above. The filled result is then upsampled at operation 724 to obtain a low-resolution initial guess of the target region in the next finer scale. At operation 726, a search is performed for similar patches that also agree with the initial guess. These patches are then employed to fill target region at operation 728. This filled result is then upsampled at operation 714 and operations 716 and 718 are performed to generate the second scaled candidate result. For a third scaled candidate result, input images downsampled at operations 710 and 720 are further downsampled at operation 730. These downsampled images are then used at operation 732 to fill the target region by the methods described above. The filled result is then upsampled at operation 734 to obtain a low-resolution initial guess of the target region in the next finer scale. At operation 736, a search is performed for similar patches that also agree with the initial guess. These patches are then employed to fill target region at operation 738. This filled result is then upsampled at operation 724 and operations 726 and 728 are performed. This filled result is further upsampled at operation 714 and operations 716 and 718 are performed to generate the third scaled candidate result. At operation 720 the various candidate results are then evaluated, for example by presenting them to a user and allowing a user to select one of candidate images. The selected candidate is then stored to memory as the modified output image, and method 701 completes.

Noting that a composition of image patches may suffer from visible seams when image patches from different locations are combined, in further embodiments the composition is performed in the gradient domain. When a low-resolution initial guess is available, gradient values may be also used to guide the estimation of the target region. In one advantageous embodiment, the per-pixel distance for a patch comparison is defined in the gradient domain as:

$$d[\Psi_p(p'), \Psi_q(p')] = \begin{cases} |\Psi_p(p') - \Psi_q(p')|, & p' \in \Psi_p^\phi \\ \alpha \sum_{i \in [x,y]} |D_i \tilde{\Psi}_p(p') - D_i \tilde{\Psi}_q(p')|, & p' \in \Psi_p^\Omega \end{cases} \quad (7)$$

where $\Psi_p^\Omega$ and $\Psi_p^\Phi$ are the regions of $\Psi_p$ that belong to the target region $\Omega_{ref}$ and the source region $\Phi$, respectively. $\tilde{\Psi}_p$ is the initial guess obtained from the previous scale and $\tilde{\Psi}_q$ is the low-resolution version of $\Psi_q$. $D_x$ and $D_y$ represent the image gradient operator in x and y direction, respectively, and $\alpha$ is a scaling factor applied to the gradient values. Comparing the gradients in this manner may avoid propagating visible seams that might be present in the initial guess. When a patch region $\Psi_p^\Omega$ is filled, gradient values are transferred rather than pixel values. Target region $\Omega_{ref}$ is then recovered through known techniques (e.g., by solving an optimization problem) employing known image processing libraries.

Figure 8:
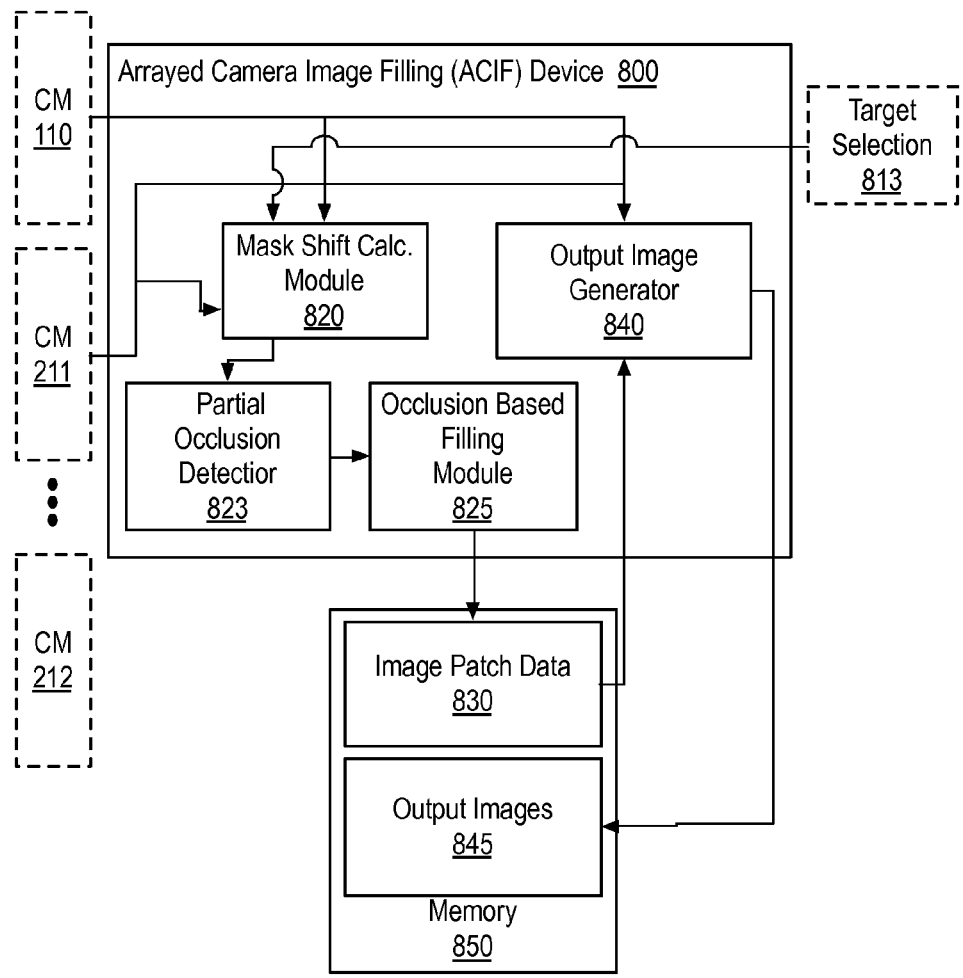
FIG. 8 is a functional block diagram of an array camera image-filling (ACIF) device, in accordance with embodiments.

FIG. 8 is a functional block diagram of an array camera image-filling (ACIF) device 800, in accordance with embodiments. ACIF device 800 is computerized to perform the image filling methods 301, 305 in an automated fashion. ACIF device 800 includes an input port to receive or retrieve input image data associated with at least two images from different camera viewpoints. The image data in the exemplary embodiment was exposed at the input image resolution by camera hardware modules (CM) 501, 502. In an alternate embodiment, input images are a pair of image frames in a stream of consecutively exposed image data frames written to a buffer by CM 501 or CM 502 at a given video frame rate.

As further illustrated in FIG. 8, ACIF device 800 further includes a mask shift calculator (calculation module) 820 coupled to receive the input images from CM 110, CM 211, CM 212, etc. Mask shift calculator 820 is further coupled to receive a target region selection 813. One or more mask shift calculator 820 may be coupled in parallel to the CM 110, 211, 212. Mask shift calculator 820 includes logic to determine a mask for a subset of the images (e.g., from CM 211, 212) based on the target region and a foreground disparity estimated for each image in the subset. In further embodiments, mask shift calculator 820 further includes logic to estimate the foreground disparity for each image in the remainder by determining a translation distance that minimizes a difference, summed over the target region, between data values in the first image and data values of corresponding positions within one of the remaining images.

An output port of mask shift calculator 820 is coupled to an input of partial occlusion region detector 823. Partial occlusion detector 823 includes logic to determine if a portion of the target region is visible in a supplementary image. In further embodiments, partial occlusion detector 823 further includes logic to determine, for the second image, an intersection of a complement of the target region translated by the foreground disparity value and the target region translated by the background disparity value. In further embodiments, partial occlusion detector 823 further includes logic to determine spatial positions in the second image corresponding to a translation of the intersection that is equal and opposite to the background disparity value An output of partial occlusion detector 823 is coupled to an input of occlusion-based image filling module 825. Filling module 825 includes logic to modify the first image by filling a destination patch associated with a point in the target region with a source patch determined from an unmasked region in one of the images. In embodiments, filling module 825 further includes logic to select the source patch from a union of all unmasked regions of the plurality of images. In advantageous embodiments, filling module 825 further includes logic to select and expand in a direction of the second camera baseline a source patch from the portion of the target region that is visible in a second image. In further embodiments, filling module 825 further includes logic to search for the source patch in a sub-region of the portion of the target region that is visible in the second image, the sub-region comprising a rectangular window centered at the point in the target region translated by a background disparity value estimated for the second image.

ACIF device 800 further includes an output image generator 840 coupled to at least one CM 110, 211, 212 designated as capturing the reference image to be modified by an image filling method performed by ACIF device 800. Output image generator generates a modified output image based on image patch data generated or otherwise identified by filling module 825. An output port of output image generator 840 is coupled to memory 850 and output image generator 540 is to store an output image 845 to memory 550.

Figure 9:
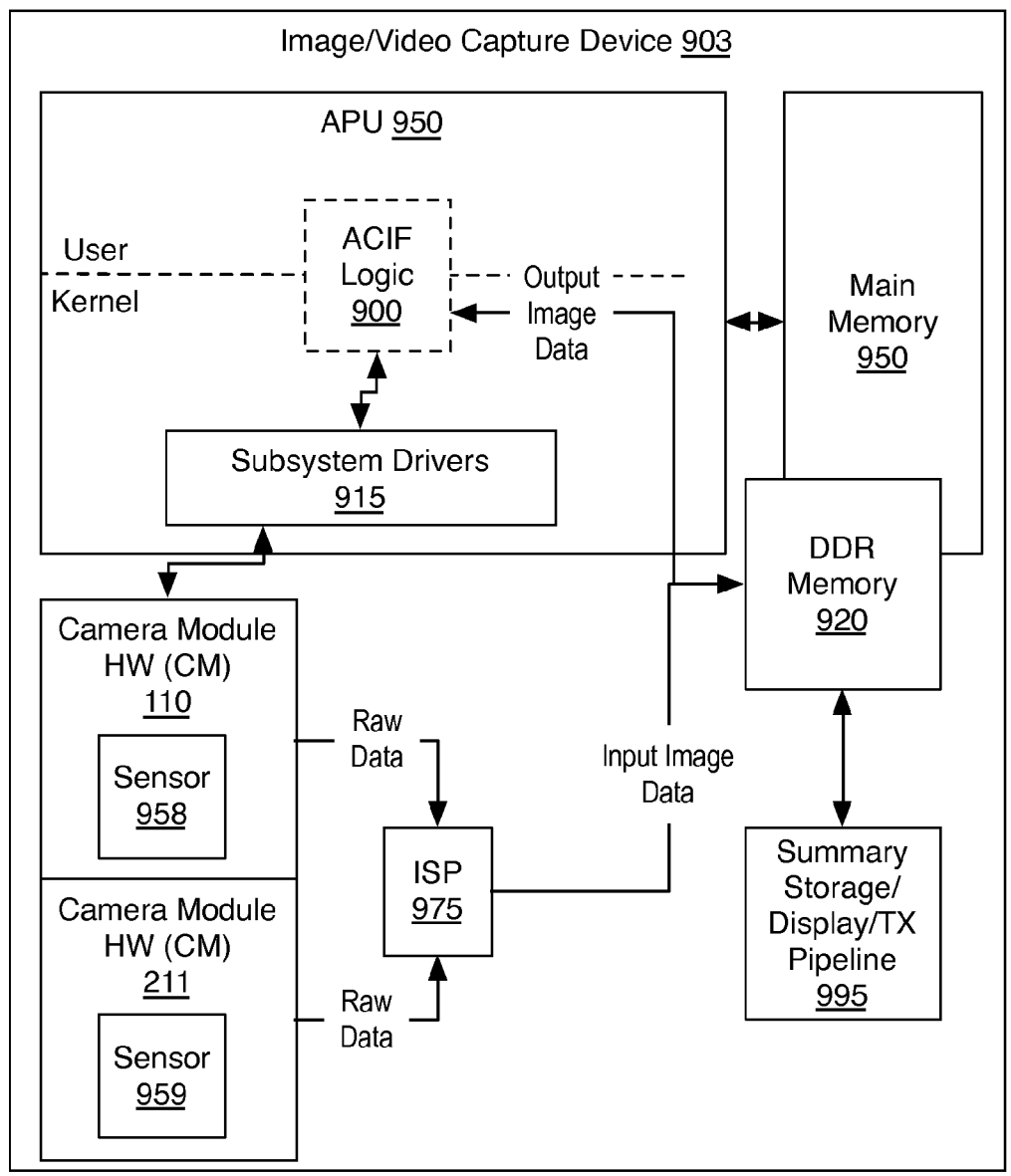
FIG. 9 illustrates an image capture device including an ACIF device, in accordance with one or more embodiment.

FIG. 9 further illustrates how an array camera image filling device may be integrated with various other components of an image and/or video capture device 903 to provide enhanced camera output suitable for pixel correspondence determinations and/or image depth processing. Image capture device 903 may, for example, be a portion of a mobile computing device platform. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Platform 903 includes CM 110 and 211. In the exemplary embodiment, CM 110 further includes a camera sensor 958 and CM 211 includes a camera sensor 959. Sensor 958 may be a HD, FHD, QXGA, WQXGA, QSXGA, or UHD format digital image device, for example. In one embodiment sensor 958 has at least 8-megapixel resolution. Sensor 959 may be a HD, FHD, QXGA, WQXGA, QSXGA, or UHD format digital image device, for example. In one embodiment sensor 959 has a lower pixel resolution than sensor 958, for example 1-5 mega pixel. Although not illustrated in FIG. 9, in further embodiments, platform 903 further includes a third CM including a third camera sensor substantially the same as sensor 959 and three images output by the three sensors are utilized by the platform 903, for example to provide image data for image filling.

Camera sensors 958, 959 may provide a color resolution of 8 bits, or more per pixel, is operable to capture continuous video frames progressively. Sensor 958 may have a pixel frequency of 170 MHz, or more. Camera sensors 958, 959 may include an RGB Bayer color filter, an analog amplifier, an A/D converter, other components to convert incident light into a digital signal corresponding to raw image data. Sensors 958, 959 may be controlled to operate a rolling shutter or electronic focal plane shutter process where pixels are read out progressively in a line-sequential fashion for a frame. In exemplary video embodiments, sensors 958, 959 output multiple consecutively exposed frames. CM 110, 211 may output raw data associated with the consecutively exposed frames in conformance with any known streaming protocol, such as a MIPI. Raw image/video data is input to ISP 975. ISP 975 is to receive and analyze frames of raw video data during the horizontal and/or vertical blanking periods associated with CM 110, 211. During raw image data processing, ISP 975 may perform one or more of color space conversion, noise reduction, pixel linearization, and shading compensation, for example.

Pre-processed video data output by ISP 975 may be buffered and queued as input image data ready for image filling based on two or more images. In exemplary embodiments, applications processor (APU) 950 implements one or more of the functional modules depicted in FIG. 8. APU 950 may for example include one or more programmable logic circuits to perform one or more stages of the image filling methods 301, 501 described above. Subsystem drivers 915 within a kernel space of an operating system (OS) instantiated by APU 950 may control various image filling parameters, such as scaling factors, camera baseline parameters, reference camera designation, etc. Access to the image filling control parameters may be further provided through an application layer executing in a user space of the OS.

Both software and hardware implementations of the image filling device described above are well suited to implementing the image filling methods 301, 501 at minimal power. For software implementations, any known programmable processor, including a core of APU 950, an execution unit of a graphics processor, or other similar vector processor, may be utilized to implement the logic of ACIF 900. In one exemplary embodiment, the ACIF device 900 is instantiated through the user space or kernel space of APU 950, for examples upon a user initiating an image capture routine. APU 950 executes the image filling algorithms and outputs a modified reference image to a downstream image-processing pipeline. APU 950 may be programmed with instructions stored on a computer readable media to cause the processor to perform any of the operations of image filling methods 301, 501.

As further illustrated in FIG. 9, output image data may be output to storage/display/transmission pipeline 995. In one exemplary storage pipeline embodiment, modified (filled) output image data is written to electronic memory 920 (e.g., DDR, etc.). Memory 920 may be a part of a main memory 910 accessible to APU 950. Alternatively, or in addition, storage/display/transmission pipeline 995 is to transmit modified (filled) output image data off image/video capture device 903.

Figure 10:
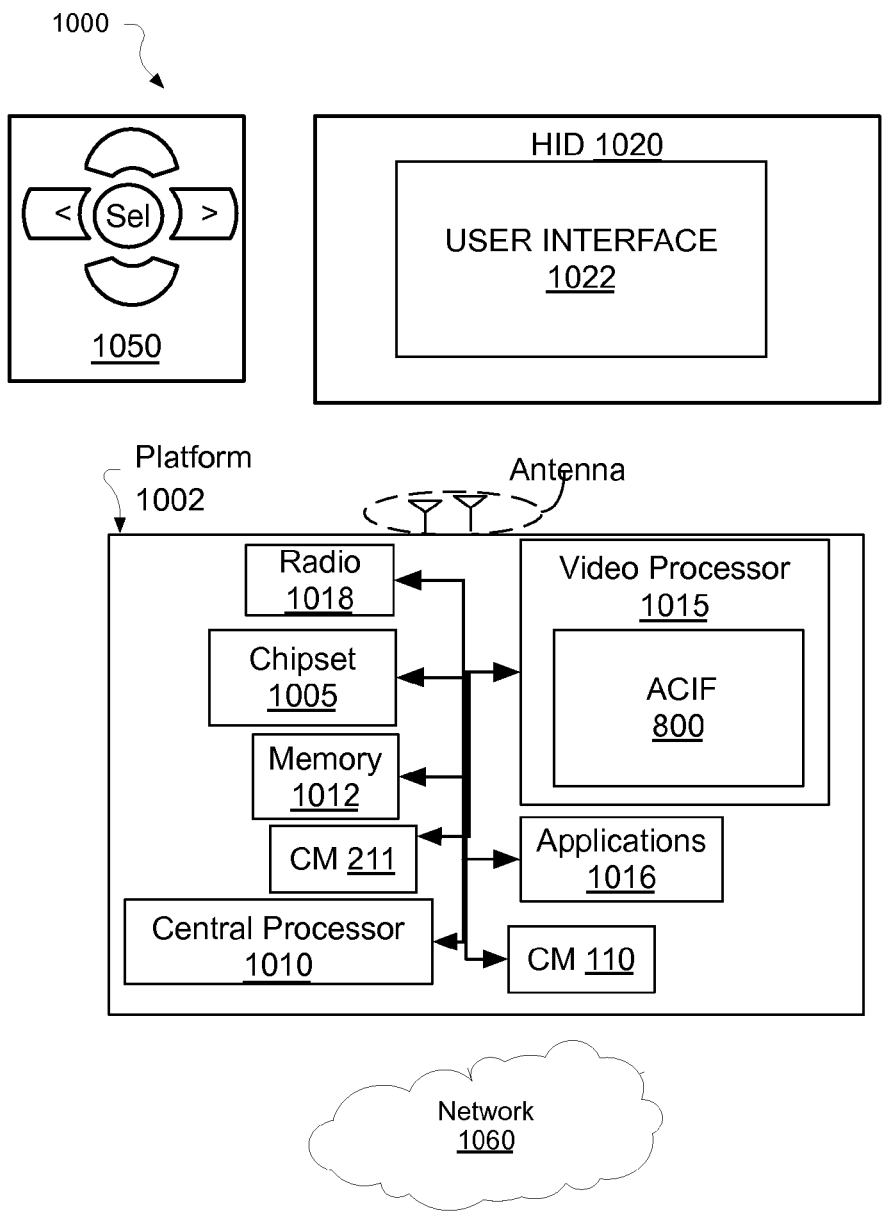
FIG. 10 is a diagram of an exemplary ultra-low power system including an ACIF device architecture, in accordance with one or more embodiment.

FIG. 10 is a diagram of an exemplary ultra-low power system 1000 employing an array camera image-filling device, in accordance with one or more embodiment. System 1000 may be a mobile device although system 1000 is not limited to this context. System 1000 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 1000 may also be an infrastructure device. For example, system 1000 may be incorporated into a large format television, set-top box, desktop computer, or other home or commercial network device.

System 1000 includes a device platform 1002 that may implement all or a subset of the various image-filling methods described above in the context of FIG. 2-FIG. 9. In various exemplary embodiments, video processor 1015 executes image-filling methods, for example as described elsewhere herein. Video processor 1015 includes logic circuitry implementing ACIF 800 to remove an object from and image, for example as described elsewhere herein. In some embodiments, one or more computer readable media may store instructions, which when executed by CPU 1010 and/or video processor 1015, cause the processor(s) to execute one or more thresholded pixel value matching algorithm, such as any of those described in detail above. Two or more data frames exposed by CM 110 and/or CM 211 may then be stored in memory 1012 as normalized/matched/rectified image data.

In embodiments, device platform 1002 is coupled to a human interface device (HID) 1020. Platform 1002 may collect raw image data with CM 110 and 211, which is processed and output to HID 1020. A navigation controller 1050 including one or more navigation features may be used to interact with, for example, device platform 1002 and/or HID 1020. In embodiments, HID 1020 may include any monitor or display coupled to platform 1002 via radio 1018 and/or network 1060. HID 1020 may include, for example, a computer display screen, touch screen display, video monitor, television-like device, and/or a television.

In embodiments, device platform 1002 may include any combination of CM 110, chipset 1005, processors 1010, 1015, memory/storage 1012, applications 1016, and/or radio 1018. Chipset 1005 may provide intercommunication among processors 1010, 1015, memory 1012, video processor 1015, applications 1016, or radio 1018.

One or more of processors 1010, 1015 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 1012 may be implemented as a volatile memory device such as, but not limited to, a Random Access Memory (RAM), Dynamic Random Access Memory (DRAM), or Static RAM (SRAM). Memory 1012 may also be implemented as a non-volatile storage device such as, but not limited to flash memory, battery backed-up SDRAM (synchronous DRAM), magnetic memory, phase change memory, and the like.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The thresholded pixel value matching and associated object processes comporting with exemplary embodiments described herein may be implemented in various hardware architectures, cell designs, or "IP cores."

Figure 11:
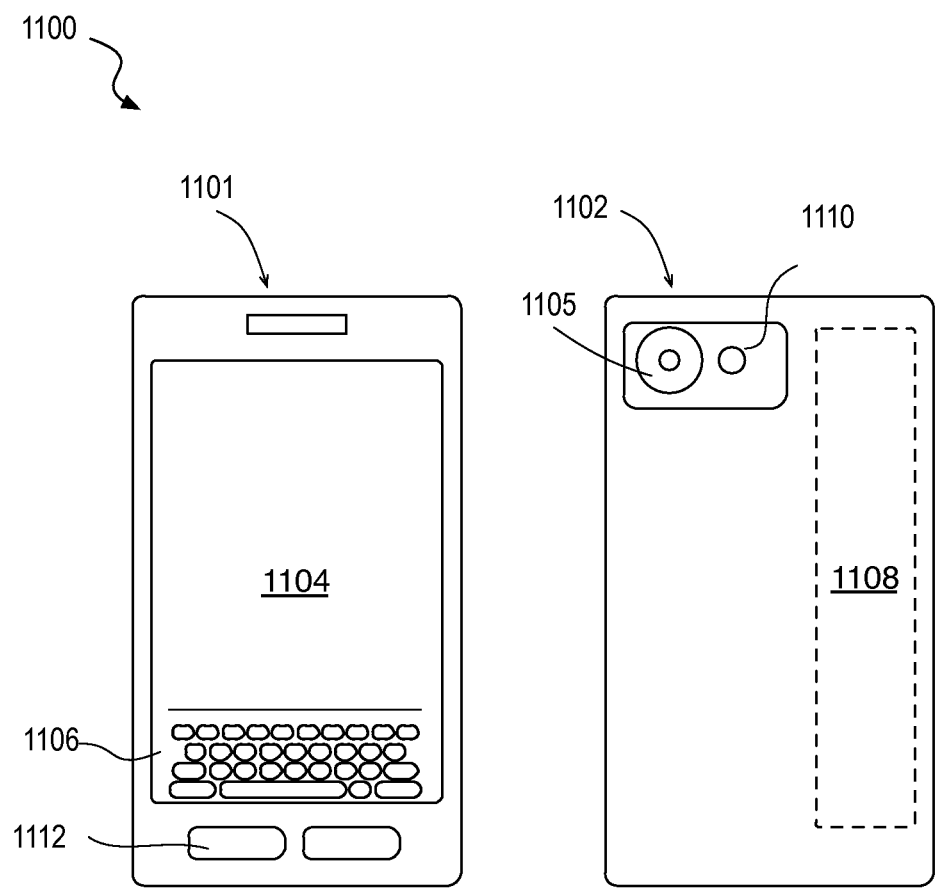
FIG. 11 is a diagram of an exemplary mobile handset platform, arranged in accordance with one or more embodiment.

As described above, system 1000 may be embodied in varying physical styles or form factors. FIG. 11 further illustrates embodiments of a mobile handset device 1100 in which platform 930 and/or system 1000 may be embodied. In embodiments, for example, device 1100 may be implemented as a mobile computing handset device having wireless capabilities. As shown in FIG. 11, mobile handset device 1100 may include a housing with a front 1101 and back 1102. Device 1100 includes a display 1104, an input/output (I/O) device 1106, and an integrated antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. Embodiments are not limited in this context. Integrated into at least the back 1102 is cameras 1105 and 1110 (e.g., each including a lens, an aperture, and an imaging sensor), both of which may be components of one or more CM through which image data is exposed and output to an array camera image filling device, for example as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiment, a computer implemented image processing method comprises receiving a plurality of images, each image associated with a different camera viewpoint. The method further comprises receiving a target region defining a portion of a first of the images that is to be filled with image data. The method further comprises computing a shifted mask for a remainder of the images, each shifted mask defining a region in one of the remaining images corresponding to the target region. The method further comprises modifying the first image by filling a destination patch associated with a point in the target region with a source patch determined from an unmasked region in one of the images. The method further comprises storing the modified first image to a memory.

In furtherance of the first embodiments, each shifted mask is computed based on the target region and a foreground disparity estimated for the target region in each image of the remainder.

In furtherance of the embodiment immediately above, the method further comprises estimating the foreground disparity in each image of the remainder by determining a translation distance that minimizes a difference, summed over the target region, between data values in the first image and data values of corresponding positions within one of the remaining images.

In furtherance of the first embodiment, filling the destination patch with the source patch further comprises selecting the source patch from a union of all unmasked regions of the plurality of images.

In furtherance of the embodiment immediately above, filling the destination patch with the source patch further comprises selecting a portion of the target region that is visible in a second image.

In furtherance of the embodiment immediately above, the method further comprises determining the portion of the target region that is visible in a second image. The method further comprises searching for the source patch in a sub-region of the portion of the target region that is visible, the sub-region comprising a rectangular window centered at the point in the target region translated by a background disparity value estimated for the second image.

In furtherance of the embodiment immediately above, the method further comprises estimating the background disparity value by determining for the first image a minimum bounding box containing the target region, determining an intersection of the bounding box and a complement of the target region, and determining a translation distance that minimizes a difference, summed over the intersection, between data values in the first image and data values of corresponding positions within the second image.

In furtherance of the embodiment above, the method further comprises determining the portion of the target region that is visible in a second image by determining an intersection of a complement of the target region translated by the foreground disparity value for the second image and the target region translated by the background disparity value for the second image, and determining spatial positions in the second image corresponding to a translation of the intersection that is equal to, and opposite of, the background disparity value.

In furtherance of the embodiment above, the method further comprises expanding the source patch in the direction of the baseline of the camera viewpoint associated with the second image.

In furtherance of the embodiment above, the second image is selected from a plurality of images in which a portion of the target region is visible to maximize the baseline distance from the camera viewpoint associated with the first image.

In furtherance of the first embodiment, the method further comprises determining the point in the target region is occluded from all of the viewpoints, and wherein the source patch is selected based on a comparison between neighborhood elements of candidate source patches and neighborhood elements of the destination patch in response to determining the point in the target region is occluded from all of the viewpoints.

In furtherance of the first embodiment, the image data comprises pixel values or gradient values, and the method further comprises upsampling the modified result and modifying the upscaled first image by filling a destination patch associated with another point in the target region.

In one or more second embodiment, a computerized array camera image filling apparatus, comprises a means to perform the method recited in any one of the preceding claims.

In furtherance of the second embodiment, the means further comprises an applications processor including a user space and a kernel space.

In one or more third embodiment, a computerized image filling apparatus, comprises an input port to receive a plurality of images, each image associated with a different camera viewpoint. The apparatus further comprises a mask shift calculation module including logic to receive a target region defining a region to be filled within a first of the images, and compute a shifted mask for a remainder of the images, each shifted mask defining a region in one of the remaining images corresponding to the target region. The apparatus further comprises an image-filling module to modify the first image by filling a destination patch associated with a point in the target region with a source patch determined from an unmasked region in one of the images. The apparatus further comprises a memory to store the modified first image.

In furtherance of the third embodiment, the mask shift calculation module is to compute each shifted mask based on the target region and a foreground disparity estimated for each image in the remainder. The mask shift calculation module further includes logic to estimate the foreground disparity for each image in the remainder by determining a translation distance that minimizes a difference, summed over the target region, between data values in the first image and data values of corresponding positions within one of the remaining images. The image-filling module further comprises logic to select the source patch from a union of all unmasked regions of the plurality of images.

In furtherance of the third embodiment, the apparatus further comprises a partial occlusion detector including logic to determine that a portion of the target region is visible in a second image, and the image-filling module further comprises logic to select the source patch from the portion of the target region that is visible in a second image.

In furtherance of the embodiment immediately above, the partial occlusion detector further comprises logic to determine, for the second image, an intersection of a complement of the target region translated by the foreground disparity value and the target region translated by the background disparity value. The partial occlusion detector further comprises logic to determine spatial positions in the second image corresponding to a translation of the intersection that is equal to, and opposite of, the background disparity value.

In furtherance of the embodiment above, the image-filling module further comprises logic to search for the source patch in a sub-region of the portion of the target region that is visible in the second image, the sub-region comprising a rectangular window centered at the point in the target region translated by a background disparity value estimated for the second image, and expand the source patch in the direction of the baseline of the camera viewpoint associated with the second image.

In furtherance of the embodiment above, the apparatus further comprises a plurality of image sensors to output the plurality of images.

In one or more fourth embodiment, one or more computer-readable storage media, with instructions stored thereon, which when executed by a processor, cause the processor to perform any one of the first embodiments.

In one or more fifth embodiment, one or more computer-readable storage media, with instructions stored thereon, which when executed by a processor, cause the processor to perform a method comprising receiving a plurality of images, each image associated with a different camera viewpoint, receiving a target region defining a target region within a first of the images, computing a shifted mask for a remainder of the images, each shifted mask defining a region in one of the remaining images corresponding to the target region, modifying the first image by filling a destination patch associated with a point in the target region with a source patch determined from an unmasked region in one of the images, and storing the modified first image to a memory.

In furtherance of the fifth embodiment, the media further stores instructions thereon, which when executed by a processor, cause the processor to further perform a method comprising estimating the foreground disparity for each image in the remainder by determining a translation distance that minimizes a difference, summed over the target region, between data values in the first image and data values of corresponding positions within one of the remaining images.

In furtherance of the fifth embodiment, the media further stores instructions thereon, which when executed by a processor, cause the processor to further perform a method further comprising selecting the source patch from a portion of the target region that is visible in a second image.

In furtherance of the embodiment immediately above, the media further stores instructions thereon, which when executed by a processor, cause the processor to further perform a method further comprising determining the portion of the target region that is visible in a second image, and searching for the source patch in a sub-region of the portion of the target region that is visible, the sub-region comprising a rectangular window centered at the point in the target region translated by a background disparity value estimated for the second image.

In furtherance of the embodiment immediately above, the media further stores instructions thereon, which when executed by a processor, cause the processor to further perform a method comprising determining the portion of the target region that is visible in a second image by determining, for the second image, an intersection of a complement of the target region translated by the foreground disparity value and the target region translated by the background disparity value, and determining spatial positions in the second image corresponding to a translation of the intersection that is equal to, and opposite of, the background disparity value.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer implemented image processing method comprising:
   receiving a plurality of images, each image associated with a different camera viewpoint;
   receiving a target region defining a portion of a first of the images that is to be filled with image data;
   computing a shifted mask for a remainder of the images, each shifted mask defining a region in one of the remaining images corresponding to the target region;
   modifying the first image by filling a destination patch associated with a point in the target region with a source patch determined from an unmasked region in one of the images; and
   storing the modified first image to a memory.

2. The method of claim 1, wherein each shifted mask is computed based on the target region and a foreground disparity estimated for the target region in each image of the remainder.

3. The method of claim 2, further comprising estimating the foreground disparity in each image of the remainder by determining a translation distance that minimizes a difference, summed over the target region, between data values in the first image and data values of corresponding positions within one of the remaining images.

4. The method of claim 1, wherein filling the destination patch with the source patch further comprises selecting the source patch from a union of all unmasked regions of the plurality of images.

5. The method of claim 4, wherein filling the destination patch with the source patch further comprises selecting a portion of the target region that is visible in a second image.

6. The method of claim 5, further comprising:
determining the portion of the target region that is visible in a second image; and
searching for the source patch in a sub-region of the portion of the target region that is visible, the sub-region comprising a rectangular window centered at the point in the target region translated by a background disparity value estimated for the second image.

7. The method of claim 6, further comprising estimating the background disparity value by:
determining for the first image a minimum bounding box containing the target region;
determining an intersection of the bounding box and a complement of the target region; and
determining a translation distance that minimizes a difference, summed over the intersection, between data values in the first image and data values of corresponding positions within the second image.

8. The method of claim 5, further comprising determining the portion of the target region that is visible in a second image by:
determining an intersection of a complement of the target region translated by the foreground disparity value for the second image and the target region translated by the background disparity value for the second image; and
determining spatial positions in the second image corresponding to a translation of the intersection that is equal to, and opposite of, the background disparity value.

9. The method of claim 5, further comprising expanding the source patch in the direction of the baseline of the camera viewpoint associated with the second image.

10. The method of claim 5, wherein the second image is selected from a plurality of images in which a portion of the target region is visible to maximize the baseline distance from the camera viewpoint associated with the first image.

11. The method of claim 1, further comprising determining the point in the target region is occluded from all of the viewpoints; and
wherein the source patch is selected based on a comparison between neighborhood elements of candidate source patches and neighborhood elements of the destination patch in response to determining the point in the target region is occluded from all of the viewpoints.

12. The method of claim 1, wherein:
the image data comprises pixel values or gradient values; and
the method further comprises upsampling the modified first image and modifying the upsampled first image by filling a destination patch associated with another point in the target region.

13. A computerized image filling apparatus, comprising:
an input port to receive a plurality of images, each image associated with a different camera viewpoint;
one or more-processors to:
receive a target region defining a region to be filled within a first of the images; and
compute a shifted mask for a remainder of the images, each shifted mask defining a region in one of the remaining images corresponding to the target region;
modify the first image by filling a destination patch associated with a point in the target region with a source patch determined from an unmasked region in one of the images; and
a memory to store the modified first image.

14. The apparatus of claim 13, wherein:
the processors are to compute each shifted mask based on the target region and a foreground disparity estimated for each image in the remainder;
the processors are to estimate the foreground disparity for each image in the remainder by determining a translation distance that minimizes a difference, summed over the target region, between data values in the first image and data values of corresponding positions within one of the remaining images; and
the processors are to select the source patch from a union of all unmasked regions of the plurality of images.

15. The apparatus of claim 13, wherein the processors are further to:
determine that a portion of the target region is visible in a second image; and
select the source patch from the portion of the target region that is visible in a second image.

16. The apparatus of claim 15, wherein the processors are further to:
determine, for the second image, an intersection of a complement of the target region translated by the foreground disparity value and the target region translated by the background disparity value; and
determine spatial positions in the second image corresponding to a translation of the intersection that is equal to, and opposite of, the background disparity value.

17. The apparatus of claim 15, wherein the processors are further to:
search for the source patch in a sub-region of the portion of the target region that is visible in the second image, the sub-region comprising a rectangular window centered at the point in the target region translated by a background disparity value estimated for the second image; and
expand the source patch in the direction of the baseline of the camera viewpoint associated with the second image.

18. The apparatus of claim 15, further comprising:
a plurality of image sensors to output the plurality of images.

19. One or more non-transitory computer-readable storage media, with instructions stored thereon, which when executed by a processor, cause the processor to perform a method comprising:
receiving a plurality of images, each image associated with a different camera viewpoint;
receiving a target region defining a target region within a first of the images;
computing a shifted mask for a remainder of the images, each shifted mask defining a region in one of the remaining images corresponding to the target region;

modifying the first image by filling a destination patch associated with a point in the target region with a source patch determined from an unmasked region in one of the images; and storing the modified first image to a memory.

20. The media of claim 19, further storing instructions thereon, which when executed by a processor, cause the processor to further perform a method comprising:

estimating the foreground disparity for each image in the remainder by determining a translation distance that minimizes a difference, summed over the target region, between data values in the first image and data values of corresponding positions within one of the remaining images.

21. The media of claim 19, further storing instructions thereon, which when executed by a processor, cause the processor to further perform a method further comprising:

selecting the source patch from a portion of the target region that is visible in a second image.

22. The media of claim 21, further storing instructions thereon, which when executed by a processor, cause the processor to further perform a method further comprising:

determining the portion of the target region that is visible in a second image; and searching for the source patch in a sub-region of the portion of the target region that is visible, the sub-region comprising a rectangular window centered at the point in the target region translated by a background disparity value estimated for the second image.

23. The media of claim 22, further storing instructions thereon, which when executed by a processor, cause the processor to further perform a method comprising:

determining the portion of the target region that is visible in a second image by:

determining, for the second image, an intersection of a complement of the target region translated by the foreground disparity value and the target region translated by the background disparity value; and determining spatial positions in the second image corresponding to a translation of the intersection that is equal to, and opposite of, the background disparity value.

* * * * *